United States Patent [19]
Pohl et al.

[11] Patent Number: 4,645,816
[45] Date of Patent: Feb. 24, 1987

[54] NOVEL VULCANIZABLE SILANE-TERMINATED POLYURETHANE POLYMERS

[75] Inventors: Eric R. Pohl, Tarrytown; Frederick D. Osterholtz, Pleasantville, both of N.Y.

[73] Assignee: Union Carbide Corporation, Danbury, Conn.

[21] Appl. No.: 749,785

[22] Filed: Jun. 28, 1985

[51] Int. Cl.$^4$ .............................................. C08G 18/38
[52] U.S. Cl. ........................................ 528/28; 528/906
[58] Field of Search ................................. 528/28, 906

[56] References Cited

U.S. PATENT DOCUMENTS

| | | | |
|---|---|---|---|
| 3,632,557 | 1/1972 | Brode et al. | 260/77.5 TB |
| 3,817,909 | 6/1974 | Toporcer et al. | 260/37 |
| 3,979,344 | 9/1976 | Bryant et al. | 260/77.5 A |
| 4,222,925 | 9/1980 | Bryant et al. | 528/49 |
| 4,374,237 | 2/1983 | Berger et al. | 528/28 |
| 4,387,177 | 6/1983 | Mine et al. | 524/425 |

FOREIGN PATENT DOCUMENTS 2738979  8/1977  Fed. Rep. of Germany .

Primary Examiner—Maurice J. Welsh
Attorney, Agent, or Firm—Steven H. Flynn

[57] ABSTRACT

Room-temperature curable isocyanate terminated polyurethane polymers whose terminal isocyanate groups have been reacted with a silane monomer having at least one dialkoxy silane group and an organo-functional group with at least one active hydrogen. The polymers crosslink to produce elastomeric polymers with improved elongation and flexibility.

9 Claims, No Drawings

NOVEL VULCANIZABLE SILANE-TERMINATED POLYURETHANE POLYMERS

FIELD OF THE INVENTION

This invention relates to a novel class of room temperature, moisture curable and silane-terminated polyurethane polymers with improved elongation, flexibility and low modulus. More particularly this invention relates to curable isocyanate terminated polyurethane polymers whose terminal isocyanate groups have been reacted with a silane monomer having at least one dialkoxy silane group and an organofunctional group with at least one active hydrogen.

BACKGROUND OF THE INVENTION

Isocyanate-terminated polyurethane prepolymers can be modified to improve or add to their basic properties by end-capping the isocyanate groups of the prepolymers with organosilanes. One method described in U.S. Pat. No. 3,632,557 utilizes trihydrocarbyloxysilanes to end-cap the polyurethane prepolymers. The trihydrocarbyloxysilyl-terminated polymers produced by this method, upon curing, form elastomers that are useful in applications that require elastomers with a high modulus of elasticity and high tensile strength, e.g. in sealants used to secure windshields in automobiles.

However, elastomers produced from polyurethane polymers end-capped with trihydrocarbyloxysilanes frequently exhibit insufficient elongation and flexibility to be useful in applications requiring elastomers that are capable of considerable stretching and contracting. For example, the elastomers used in moisture barrier sealants in expansion joints of high rise buildings frequently need the ability to stretch and compress without tearing and cracking. These joints often have widths of six inches or more and changes in temperature can cause expansions and contractions of these joints of ±50%. These elastomers formed from polyurethane polymers end-capped with trihydrocarbyloxysilanes in many cases would not be effective as sealants in expansion joints because this application often requires elastomers with higher elongation and more flexibility than is provided by such silanes. Improved elongation and flexibility would also be desirable in elastomers utilized in other applications, e.g., in coatings, gaskets, fiber sizes, adhesives and the like.

Accordingly, it is an object of the present invention to provide improved hydrocarbyloxysilyl-terminated polyurethane polymers and sealant compositions containing such polymers, which upon curing, form elastomeric polymers with improved elongation, improved flexibility and a lower modulus of elasticity.

DESCRIPTION OF THE INVENTION

This invention relates to vulcanizable dihydrocarbyloxysilyl-terminated polyurethane polymers comprising the reaction product of an isocyanate-terminated polyurethane prepolymer and a silane of the formula $$(RO)_2-\underset{\underset{R^1}{|}}{Si}-R^2-Z-H$$

wherein
R is $C_1$–$C_6$ alkyl or $C_6$–$C_{12}$ aryl;
$R^1$ is $C_1$–$C_4$ alkyl;
$R^2$ is $C_2$–$C_{18}$ alkylene or $C_6$–$C_{18}$ arylene; and
Z is —O—, —S—, or $$-\underset{\underset{R^3}{|}}{N}-,$$

wherein $R^3$ is hydrogen, $$-\overset{\overset{O}{\|}}{C}NH_2,$$

or $C_1$–$C_6$ alkyl, aminoalkyl or diaminoalkyl wherein $R^3$ is preferably hydrogen or $C_1$–$C_6$ alkyl, with the proviso that when Z is —O—, $R^2$ must be $C_4$–$C_{18}$ alkylene or $C_6$–$C_{18}$ arylene, to provide the vulcanizable dihydrocarbyloxysilyl-terminated polyurethane polymer with terminal end-blocking units of the formula $$(RO)_2-\underset{\underset{R^1}{|}}{Si}-R^2-Z-\overset{\overset{O}{\|}}{C}-NH-$$

wherein R, $R^1$, $R^2$ and Z are as defined above.

It is appreciated that when Z contains an active hydrogen, this active hydrogen could potentially provide an additional reactive site on the silane for the isocyanate-terminated polyurethane prepolymer.

The isocyanate-terminated polyurethane prepolymers useful in the present invention are prepared by reacting a molar excess of organic diisocyanate with one or more diols. A summary of the urethane polymer chemistry and technology relevant to the production of such prepolymers can be found in Polyurethanes: Chemistry and Technology, Saunders and Frisch, Interscience Publishers (New York, 1963 (Part I) and 1964 (Part II).

Any suitable organic diisocyanate, either aliphatic, cycloaliphatic, araliphatic, or aromatic, may be used. Suitable organic diisocyanates include meta-phenylene diisocyanate, paraphenylene diisocyanate, 4,4'-diphenylmethane diisocyanate, benzidine diisocyanate, naphthalene-1,5-diisocyanate, hexamethylene diisocyanate, decamethylene diisocyanate, dianisidine diisocyanate, xylylene diisocyanate, bis(2-isocyanatoethyl)-fumarate, bis(2-isocyanatoethyl)cyclohex-4-ene-1, bis(2-isocyanatoethyl)carbonate, and other organic diisocyanates known in the art, such as those disclosed by Siefken, Annalen, 565, 122–135 (1949).

In producing the isocyanate-terminated polyurethane prepolymers of the present invention, one or more diols can be employed in the reaction with the organic diisocyanate.

Illustrative diols include the following classes of compounds:

(a) lactone diols and the alkylene oxide adducts thereof;
(b) the polyester diols, and the alkylene oxide adducts thereof;
(c) the polyoxyalkylene diols and polyoxycycloalkylene diols, and the alkylene oxide adducts thereof;
(d) the alkylene oxide adducts of diphenols;
(e) the polytetramethylene glycols;
(f) dihydroxy polysulfide polymers;

(g) hydroxy-terminated extended lactone polyesters prepared by phosgenating a lactone polyester with a diol such as bisphenol A, and the like.

The term "alkylene oxide" includes, for example, ethylene oxide, 1,2-epoxypropane, 1,2-epoxybutane, 2,3-epoxybutane, isobutylene oxide oxide, epichlorohydrin, and the like, and mixtures thereof.

Lactone diols are prepared by reacting a lactone such as epsilon-caprolactone or a mixture of epsilon-caprolactone and an alkylene oxide with a difunctional initiator such as dihydric alcohol. The term "lactone diols" also includes the various "copolymers" such as lactone copolyesters, lactone polyester/polycarbonates, lactone polyester/polyethers, lactone polyester/polyether/polycarbonates, and the like. Useful lactone diols, their preparation and properties are more fully described in U.S. Pat. Nos. 2,878,236, 2,890,208, 2,933,477, 2,933,478 and 3,169,945.

Polyester diols are esterification products which range from liquids to non-crosslinked solids, i.e., solids which are soluble in many of the more common inert normally liquid organic media, and which are prepared by the reaction of dicarboxylic acids, their anhydrides, their esters, or their halides, with a stoichiometric excess of a diol. This esterification reaction is well known in the art. Illustrative of the dicarboxylic acids which can be employed to prepare the polyester diols preferably include maleic acid, succinic acid, glutaric acid, adipic acid, pimelic acid, suberic acid, azelaic acid, sebacic acid, chlorendic acid, phthalic acid, and the like.

Polyoxyalkylene diols include alkylene oxide adducts of, for example, water, ethylene glycol, diethylene glycol, propylene glycol, dipropylene glycol, and the like. The alkylene oxides employed in producing polyoxyalkylene diols normally have from 2 to 4 carbon atoms. Ethylene oxide, propylene oxide and mixtures of propylene oxide with ethylene oxide are preferred. Such polyalkylene diols are well known in the art.

Alkylene oxide adducts of diphenols include those in which the diphenol can be bisphenol A, bisphenol B, and the like.

Another useful class of diols is the polytetramethylene glycols, which are prepared by polymerizing tetrahydrofuran in the presence of the acidic catalyst.

Suitable dihydroxy polysulfide polymers have the formula

HO—R'—SS(R"SS)$_n$R'—OH wherein R' and R" are divalent aliphatic radicals wherein the carbon chain may be interrupted by oxygen atoms and n is an integer having a value of from 1 to 100, which can be prepared by reacting a dihalo-organic compound such as Cl—R"—Cl, a chlorohydrin such as Cl—R"—OH and an inorganic polysulfide.

The diol or diol mixture employed can have hydroxyl numbers which vary over a wide range. In general, the hydroxyl numbers of the diols employed in the invention can range from about 20, and lower, to about 1000, and higher, preferably, from about 30 to about 800, and more preferably from about 35 to about 700. The hydroxyl number is defined as the number of milligrams of potassium hydroxide required for the complete neutralization of the hydrolysis product of the fully acetylated derivative prepared from 1 gram of diol. The hydroxyl number can also be defined by the equation:

$$OH = \frac{56.1 \times 1000 \times f}{M.W.}$$

where
OH = hydroxyl number of the diol
F = average functionality, this is average number of hydroxyl groups per molecule of diol
M.W. = average molecular weight of the diol.

The most preferred diisocyanates are alkylene diisocyanates and aromatic diisocyanates, especially tolylene diisocyanate and bis-(4-isocyanatohexyl)methane, while the most preferred diols are the diols of polyalkylene glycols and the diols of polycaprolactones.

As pointed out above to prepare the isocyanate-terminated polyurethane prepolymers useful in this invention, at least a slight mole excess of —NCO equivalents (groups) with respect to the hydroxyl equivalents (groups) is employed to end-block the polymer chain with isocyanate groups. Of course, it should be understood that as well as employing a single type of diisocyanate compound and a single type of diol compound, mixtures of various diisocyanates as well as mixtures of various diols may be used if desired. Furthermore, it should also be clear that the backbone of the isocyanate-terminated prepolymers comprises at least two repeating units and preferably more than two repeating units of the formula

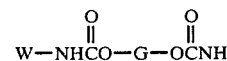

wherein G represents the residue on removal of the terminal OH groups from the diol employed; and wherein W represents the residue on removal of the terminal —NCO groups of the diisocyanate. Thus, the backbone of said prepolymers is essentially free from other types of repeating units such as urea and the like.

For purposes of the present invention, useful isocyanate-terminated polyurethanes will have a molecular weight that is governed by their intended end use. When used without a solvent, the polymers should not be too viscous and generally have a molecular weight of from about 2,000 to about 20,000 preferably from about 4,000 to about 14,000. When used with a solvent viscosity problems can be avoided and molecular weights greater than 20,000 can be used provided there is a sufficient concentration of hydrolyzable end groups to form a three-dimensional, cross-linked network upon curing. Where a solvent is employed, it should be inert with respect to the polymer and volatile under the curing conditions.

Suitable catalysts for the preparation of the polyurethane prepolymers of this invention are disclosed in U.S. Pat. No. 4,067,844, Column 3, lines 25 to 36 inclusive.

It should be noted that although the present invention is directed primarily to the use of diisocyanates and diols with average functionalities of about 2, polyisocyanates and/or polyols with functionalities greater than about 2 can be incorporated into the polyurethane prepolymer in low concentrations (i.e. less than 10% by weight and preferably less than 2% by weight, based on the total weight of the isocyanates and diols present) without departing from the scope of this invention. The elongation and flexibility of the cured elastomers produced from such polyurethane prepolymers will decrease, however, as the concentration of polyisocyanates and/or polyols with a functionality greater than 2 increases.

Preferred silane starting materials include those wherein R is $C_1$–$C_6$ alkyl; $R^2$ is $C_2$–$C_8$ alkylene; and Z is —S— or NH. Most preferred silane monomers include those wherein R and $R^1$ are methyl or ethyl; $R^2$ is ethylene or propylene; and Z is NH.

Illustrative of the silane monomer starting materials which can be used in this invention are the following:

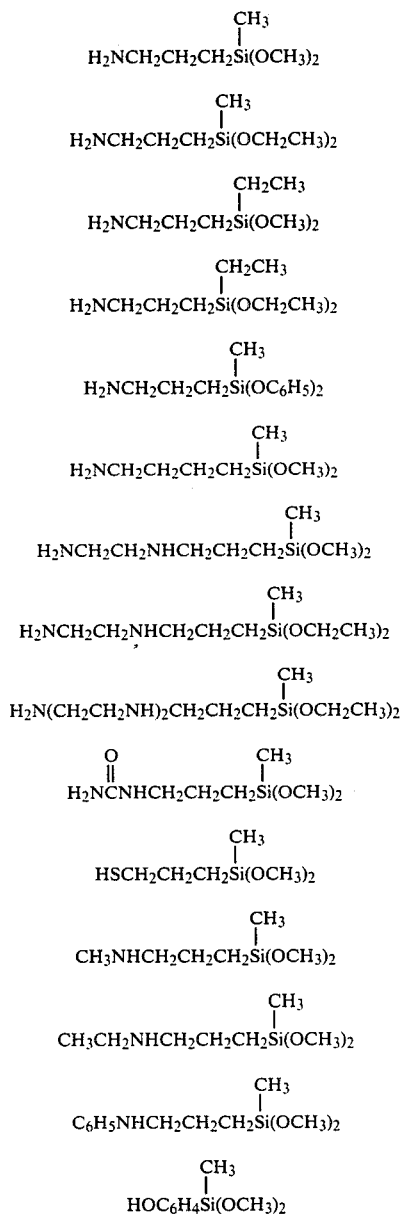

The vulcanizable dihydrocarbyloxysilyl-terminated polymers of this invention can be prepared by reacting about a stoichiometric amount of an isocyanate terminated polyurethane prepolymer with about a stoichiometric amount of the silane starting material defined above. Accordingly, each mole of isocyanate-terminated polyurethane prepolymer requires two moles of the silane starting material for the reaction to form the novel polymers of this invention. Preferably, a slight excess of the silane starting material should be employed to insure a complete reaction of all the isocyanate terminal groups on the prepolymer. The reaction is conducted preferably in the absence of moisture and at temperatures, for example, ranging from about 0° C. to about 150° C., or higher if desired, most preferably about 20° C. to about 100° C. An inert diluent can be employed if desired to facilitate the reaction. The reaction may be conducted at atmospheric, super-atmospheric or sub-atmospheric pressures.

The polymers of this invention vulcanize or cure into a cross-linked, three-dimensional network upon exposure to moisture. The cure rate is dependent on atmospheric temperature, relative humidity, and the like. It is generally preferred to employ the polymer in the form of a sealant composition comprising the polymer and a catalyst to facilitate the vulcanization of the polymer. These compositions form part of this invention. Any well known silanol condensation catalyst may be employed, for example, alkyl titanates, organosilicon titanates, metal salts of carboxylic acids such as stannous octoate, dibutyltin-dilaurate and the like, amine salts such as dibutylamine-2-ethylhexoate and the like, etc. The catalyst can be added during or after the preparation of the polymer and is used in an amount sufficient to cure the polymer upon exposure to moisture, for example from about 25 to about 20,000 parts by weight per million parts by weight of the polymer, preferably from about 2000 to about 10,000 parts by weight per million parts by weight of the polymer.

The sealant compositions containing the polymers of this invention can also contain any of the conventional elastomer fillers, e.g., reinforcing fillers, such as fumed silicas, silica aerogels and precipitated silicas of high surface area. Non-reinforcing fillers can also be used, for example, coarse silicas, such as diatomaceous earth, crush quartz or metallic oxides, such as titania, ferric oxide, zinc oxide, talc and the like. In addition fibrous fillers such as asbestos or glass fibers or filaments may be used. In all cases, it is desirable that the filler be substantially dry before being admixed with the polymers. The fillers are generally employed to upgrade physical properties and to modify the flow characteristics of the uncured polymer. The polymers of this invention may also contain modifiers such as resinous siloxane modifiers as plasticizers or to make the polymers more dough-like and less resilient, adhesion promoters or silane coupling agents, as well as additives such as pigments, UV stabilizers, oxidation inhibitors and the like or dielectric substances such as graphite and carbon black. The fillers, modifiers and additives can comprise up to about 70% by weight of the sealant composition based on the total weight of the composition, with the proviso that the reinforcing fillers comprise no more than about 30% by weight of the composition. As a practical matter, however, it is preferable that the fillers, modifiers and additives be present in the sealant composition in the range of from about 0–40% by weight based on the total weight of the composition and that the reinforcing fillers only comprise from about 0–20% by weight of the composition. It is immaterial whether these fillers, modifiers or additives and the like are added to the polymers of this invention during or after their preparation as described herein. However, it is most preferable that they be added under substantially anhydrous conditions.

The vulcanizable polymers of this invention are useful in coating applications and in caulking and sealing applications on buildings, airplanes, bathroom fixtures, automotive equipment or wherever elastomeric polymers with improved elongation and flexibility are desired. Another desirable feature of these vulcanizable polymers is their ability to be applied to moist or wet surfaces and be cured into a cross-linked elastomer without deleterious effects, which cured product becomes tack-free within a relatively short period of time. Moreover, the cured polymers of this invention strongly adhere alone or with the aid of a primer to a wide variety of substrates such as glass, porcelain, wood, metals, polymeric materials and the like making them especially suited for any type of caulking, adhesive or laminating application.

The cured polymers of this invention provide a combination of the desirable properties of hydrocarbyloxysilane-terminated polyurethane polymers such as tear resistance, extensibility, elastic recovery, and the like, while at the same time providing the desirable properties of improved elongation and flexibility and lower modulus of elasticity. Improved elongation and lower modulus of elasticity, e.g., can significantly reduce the stresses on polyurethane sealants at the interface of the substrate during expansions and contractions of joints. These properties help to minimize adhesive failure of the sealants.

The following Examples are presented to illustrate the present invention.

The abbreviations and symbols used in the Examples have the following meanings:

| ABBREVIATION OR SYMBOL | MEANING |
| --- | --- |
| gm | gram |
| °C. | degrees Centigrade |
| mm | millimeter |
| rpm | revolutions per minute |
| % | percent |
| psi | pounds per square inch |
| ppi | pounds per inch |

EXAMPLE 1

An 80:20 mixture of 2,4- and 2,6-toluenediisocyanate (TDI) (180 gm, 1.0 mole) was charged to a 3-liter, three-neck, round bottom flask that was equipped with a mechanical stirrer, a heating mantle, a thermometer and a 1-liter dropping funnel. Slowly, polypropylene glycol (PPG) with an average molecular weight of 2000 (1570 gm, 0.78 mole) was added with stirring at room temperature followed by the addition of dibutyltin-dilaurate (0.003 gm). The reaction mixture was heated at 90° C. for 3 hours and then cooled to room temperature to produce the NCO-terminated polyurethane prepolymer. A small sample of the prepolymer so formed was removed and titrated for percent NCO using a standardized solution of dibutylamine in toluene. The percent NCO was 1.22.

Gamma-aminopropylmethyldimethoxysilane (APDMS) (42.75 gm, 0.262 mole) was slowly added with stirring to the NCO-terminated polyurethane prepolymer (860 gm, 0.126 moles). The reaction mixture was heated at 90° C. for 3 hours and then cooled to produce the silane-terminated polyurethane polymer.

To prepare a sealant composition, the silane-terminated polyurethane polymer so formed (800 gm, 0.11 mole), micro talc (240 gm) and dibutyltindilaurate (4.0 gm) were charged to a one-gallon Ross Double Planatary Mixer. The mixer was evacuated to 3 mm Hg pressure and heated by steam to approximately 95° C. The mixture was stirred for one hour at 30 rpm orbital speed.

COMPARATIVE EXAMPLE A

The same procedure as described in Example 1 was used except that gamma-aminopropyltrimethoxysilane (APTMS) (46.90 gm, 0.262 mole) was used instead of gamma-aminopropylmethyldimethoxysilane (APDMS) to end-cap the isocyanate-terminated polyurethane prepolymer.

EXAMPLE 2

An 80:20 mixture of 2,4- and 2,6-toluenediisocyanate (TDI) (250 gm, 1.44 mole) was charged to a 3-liter, three-neck, round bottom flask that was equipped with a mechanical stirrer, a heating mantle, a thermometer and a 1-liter dropping funnel. Slowly, polypropylene glycol (PPG) with an average molecular weight of 2000 (1,450 gm, 0.72 mole) was added with stirring at room temperature followed by the addition of dibutyltindilaurate (0.003 gm). The reaction mixture was heated at 90° C. for 3 hours and then cooled to room temperature to produce the NCO-terminated polyurethane prepolymer. A small sample of the prepolymer so formed was removed and titrated for percent NCO using a standardized solution of dibutyl amine in toluene. The percent NCO was 2.60.

Gamma-aminopropylmethyldimethoxysilane (APDMS) (89.6 gm, 0.550 mole) was slowly added with stirring to the NCO-terminated polyurethane prepolymer (845 gm, 0.262 mole). The reaction was heated at 90° C. for 3 hours and then cooled to produce the silane-terminated polyurethane polymer.

To prepare a sealant composition, the silane-terminated polyurethane polymer so formed (600 gm, 0.169 mole), micro talc (180 gm) and dibutyltindilaurate (3.0 gm) were charged to a 1-gallon Ross Double Planatary Mixer. The mixer was evacuated to 3 mm Hg pressure and heated by house steam to approximately 95° C. The mixture was stirred for one hour at 30 rpm orbital speed.

COMPARATIVE EXAMPLE B

The same procedure as described in Example 3 was used except that gamma-aminopropyltrimethoxysilane (APTMS) (98.5 gm, 0.550 mole) was used instead of gamma-aminopropylmethyldimethoxysilane (APDMS) to end-cap the isocyanate-terminated polyurethane prepolymer.

EXAMPLE 3

An 80:20 mixture of 2,4- and 2,6-toluenediisocyanate (TDI) (125 gm, 0.72 mole) was charged to a 3-liter, three-neck, round bottom flask that was equipped with a mechanical stirrer, a heating mantle, a thermometer and a 1-liter dropping funnel. Slowly, polypropylene glycol (PPG) with an average molecular weight of 2000 (725 gm, 0.36 mole) was added with stirring at room temperature followed by the addition of dibutyltindilaurate (0.002 gm). The reaction mixture was heated at 90° C. for 3 hours and then cooled to room temperature to produce the NCO-terminated polyurethane prepolymer. A small sample of the prepolymer so formed was removed and titrated for percent NCO using a standardized solution of dibutyl amine in toluene. The percent NCO was 4.27.

Gamma-aminopropylmethyldimethoxysilane (APDMS) (148 gm, 0.91 mole) was slowly added with stirring to the NCO-terminated polyurethane prepolymer (850 gm, 0.432 mole). The reaction mixture was heated at 90° C. for 3 hours and then cooled to produce the silane-terminated polyurethane polymer.

To prepare a sealant composition, the silane-terminated polyurethane polymer so formed (860 gm, 0.375 mole), microtalc (258 gm) and dibutyltindilaurate (4.3 gm) were charged to a one-gallon Ross Double Planatary Mixer. The mixer was evacuated to 3 mm Hg pressure and heated by steam to approximately 95° C. The mixture was stirred for one hour at 30 rpm orbital speed.

A summary of the data on the silane-terminated polyurethane polymers prepared by the methods of the Examples is listed in Table I.

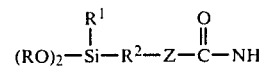

wherein

R is $C_1$–$C_{16}$ alkyl or $C_6$–$C_{12}$ aryl;

$R^1$ is $C_1$–$C_4$ alkyl;

$R_2$ is $C_2$–$C_{18}$ alkylene or $C_6$–$C_{18}$ arylene; and

Z is —O—, —S— or —$NR^3$, wherein $R^3$ is hydrogen,

TABLE I

| Polymer No. | From Example No. | Prepolymer Reaction Mixture | | % NCO in Prepolymer | Moles of APDMS Reacted with Prepolymer | Moles of APTMS Reacted with Prepolymer | Molecular Weight of Final Polymer[a] |
|---|---|---|---|---|---|---|---|
| | | Moles of PPG | Moles of TDI | | | | |
| I | 1 | 0.38 | 0.50 | 1.22 | 0.262 | — | 7211 |
| II | A | 0.38 | 0.50 | 1.22 | — | 0.262 | 7243 |
| III[b] | 2 | 0.35 | 0.70 | 2.60 | 0.55 | — | 3560 |
| IV[b] | B | 0.35 | 0.70 | 2.60 | — | 0.55 | 3590 |
| V | 3 | 0.36 | 0.72 | 4.28 | 0.91 | — | 2290 |

[a]Calculated from % NCO.
[b]The TDI was probably trimerized.

The sealant composition of each Example was then used to make test specimens according to the procedures outlined in Interim Federal Specification TT-S-00230C (COM-NDS) Sealing Compounds: Elastomeric type, single component (for caulking, sealing and glazing in building and other structures). The physical properties of each cured sealant composition were measured according to the procedures described in the Interim Federal Specification and are listed in Table II.

TABLE II

Physical Properties of cured sealant compositions[a] that were formulated with the polymers described in Table I.

| Sealant Composition Formulated with Polymer No. | I | II[b] | III | IV[b] | V |
|---|---|---|---|---|---|
| Hardness (Shore A, points) | 40 | 55 | 45 | 72 | 72 |
| Tensile (psi) | 441 | 648 | 318 | 547 | 728 |
| % Elongation | 193 | 113 | 106 | 52 | 81 |
| Modulus (50%) | 148 | 312 | 161 | 548 | 544 |
| Tear (ppi) | 73 | 92 | 47 | 113 | 98 |

[a]Sealant Formulation: 100 parts prepolymer; 30 parts microtalc; 0.5 parts dibutyl tin dilaurate (M&T, trade name T-12)
[b]Comparative polymer The data in Table II clearly demonstrates the superior flexibility and elasticity of cured sealant compositions containing the dihydrocarbyloxysilyl-terminated polyurethane polymers of the present invention (i.e. polymers I and III) when compared to cured sealant compositions containing the comparative trihydrocarbyloxysilyl-terminated polyurethane polymers of the prior art (i.e. polymers II and IV). The polymers of the present invention (I and III) provided cured sealant compositions with a lower tensile strength, lower modulus of elasticity and higher percent elongation than the cured sealant compositions provided by the comparative polymers of the prior art (II and IV).

What is claimed is:

1. A process for producing vulcanizable, dihydrocarbyloxysilyl-terminated polyurethane polymers having terminal end-blocking units of the formula:

or $C_1$–$C_{16}$ alkyl, aminoalkyl or diaminoalkyl, with the proviso that when Z is —O—, $R^2$ must be $C_4$–$C_{18}$ alkylene or $C_6$–$C_{18}$ arylene, which comprises reacting:

(a) the —NCO terminal groups of an isocyanate-terminated polyurethane prepolymer with (b) at least a stoichiometric amount of silane monomer of the formula:

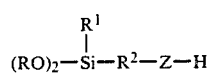

wherein R, $R^1$, $R^2$ and Z are as defined above.

2. A process as recited in claim 1 wherein

R is $C_1$–$C_{16}$ alkyl;

$R^2$ is $C_2$–$C_8$ alkylene; and

Z is —S— or NH.

3. A process as recited in claim 2 wherein

R and $R^1$ are methyl or ethyl:

R2 is ethylene or propylene; and

Z is NH.

4. A process as recited in claim 3 wherein the silane is gammaaminopropyldimethoxymethylsilane.

5. A process as recited in claim 1 wherein the polyurethane prepolymer is the reaction product of polyoxyalkylene diol and an aromatic diisocyanate.

6. The process as recited in claim 5 wherein the polyoxyalkylene diol is polyoxyalkylene glycol and the aromatic diisocyanate is toluene diisocyanate.

7. The process as recited in claim 6 wherein the polyoxyalkylene glycol is polypropylene glycol.

8. The process as recited in claim 1 further comprising admixing with said polyurethane prepolymer and said silane monomer a silanol condensation catalyst in an amount sufficient to cure the polymer upon exposure to moisture.

9. The process as recited in claim 1 further comprising admixing a filler with said polyurethane prepolymer and said silane monomer.

* * * * *